United States Patent
Matsuba et al.

(10) Patent No.: US 9,819,968 B2
(45) Date of Patent: Nov. 14, 2017

(54) METHOD AND APPARATUS FOR ERROR DETECTION IN CABAC

(75) Inventors: Yasutomo Matsuba, Allen, TX (US); Akira Osamoto, Plano, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 794 days.

(21) Appl. No.: 13/349,350

(22) Filed: Jan. 12, 2012

(65) Prior Publication Data
US 2012/0177131 A1  Jul. 12, 2012

Related U.S. Application Data

(60) Provisional application No. 61/431,971, filed on Jan. 12, 2011, provisional application No. 61/450,848, filed on Mar. 9, 2011, provisional application No. 61/469,536, filed on Mar. 30, 2011.

(51) Int. Cl.
*H04N 19/895* (2014.01)
*H04N 19/89* (2014.01)
*H04N 19/70* (2014.01)

(52) U.S. Cl.
CPC .......... *H04N 19/89* (2014.11); *H04N 19/70* (2014.11); *H04N 19/895* (2014.11)

(58) Field of Classification Search
CPC combination set(s) only.
See application file for complete search history.

(56) References Cited

U.S. PATENT DOCUMENTS

| | | | | |
|---|---|---|---|---|
| 6,404,817 B1* | 6/2002 | Saha | ............. | H04N 19/895 348/425.2 |
| 9,124,895 B2* | 9/2015 | Wang | ............. | H04N 19/176 |
| 2006/0013318 A1* | 1/2006 | Webb | ............. | H04N 19/70 375/240.25 |
| 2008/0049844 A1* | 2/2008 | Liu | ............. | H04N 19/61 375/240.27 |
| 2008/0095243 A1* | 4/2008 | Park | ............. | H04N 19/70 375/240.24 |
| 2009/0144596 A1* | 6/2009 | Mohan | ............. | G11B 20/18 714/746 |
| 2009/0213938 A1* | 8/2009 | Lee | ............. | H04N 19/70 375/240.24 |

(Continued)

OTHER PUBLICATIONS

ITU-T Recommendation H.264 (Mar. 2009), Advanced Video Coding for Generic Audiovisual Services.

*Primary Examiner* — Dave Czekaj
*Assistant Examiner* — Tyler W Sullivan
(74) *Attorney, Agent, or Firm* — Robert D. Marshall, Jr.; Charles A. Brill; Frank D. Cimino

(57) ABSTRACT

A method and apparatus for error detection. The method includes decoding slice header when a unit is a NAL unit, decoding a macroblock unit and detecting an end of slice flag setting indicating end of slice, decoding RBSP(Raw Byte Sequence Payload) trailing bits and determining if it is end of slice, and determining an error occurred when it is not end of slice. The apparatus configured to decoding via a digital processor a slice header when a unit is a NAL unit, decoding a macroblock unit and detecting an end of slice flag setting indicating an end of slice, decoding RBSP trailing bits and determining if it is the end of slice, and determining an error occurred when it is not end of slice.

4 Claims, 4 Drawing Sheets

(56) References Cited

U.S. PATENT DOCUMENTS

| | | | |
|---|---|---|---|
| 2010/0061466 A1* | 3/2010 | Gozen | G10L 19/167 375/240.28 |
| 2010/0322317 A1* | 12/2010 | Yoshimatsu | H04N 19/70 375/240.24 |
| 2012/0106652 A1* | 5/2012 | Huang | H04N 19/70 375/240.25 |

* cited by examiner

THESE 3 BYTES ARE NOT cabac_zero_word PLUS EPB(0x03), BUT A PART OF THE NEXT macroblock_layer()

ARE THESE 3 BYTES cabac_zero_word + EPB(0x03), OR BITS IN THE NEXT macroblock_layer()?

METHOD AND APPARATUS FOR ERROR DETECTION IN CABAC

CROSS-REFERENCE TO RELATED APPLICATIONS

This application claims benefit of U.S. provisional patent application Ser. No. 61/431,971,filed Jan. 12, 2011, 61/450, 848, filed Mar. 9, 2011 and 61/469,536, filed Mar. 30, 2011, which are herein incorporated by reference.

BACKGROUND OF THE INVENTION

Field of the Invention

Embodiments of the present invention generally relate to a method and apparatus for simplifying error detection in Context-Adaptive Binary Arithmetic Coding.

Description of the Related Art

Decoder can detect bitstream errors in slice data by comparing the number decoded bits and the size of the current Network Abstract Layer (NAL) unit. If the numbers are mismatched, it is likely that the decoded bitstream includes errors. During slice data decoding, decoder can detect bitstream errors, which maybe result from a number of reason, such as, decoded syntax element is out of range, alignment one bit is not 1, alignment zero bit is not 0, and the likes. In many cases, bit corruptions or packet loss may cause one or more of such conditions. A decoder can detect the errors. But if the corruption of bits or packet loss accidentally forms the correct syntax elements without causing the detectable conditions, the errors may not be detected during slice data decoding.

Detecting mismatch of NAL unit size and decoded bits is usually a strong tool for the error detection. Even if the corruption of bits or packet loss accidentally forms the correct syntax element, the error can be detected when the decoded number of bits does not match the size of NAL unit. In this contribution, this method is called detection of NAL unit size mismatch.

The detection of Network Abstract Layer unit size mismatch can be easily implemented in the case of Context-adaptive variable-length coding (CAVLC). But it is difficult to implement it in the case of Context-Adaptive Binary Arithmetic Coding. This is due to the existence of cabac_zero_word in Context-Adaptive Binary Arithmetic Coding syntax. The next section explains how the detection is implemented in Advanced Video coding (AVC).

```
rbsp_slice_trailing_bits( ) {
    rbsp_trailing_bits( )
    if( entropy_coding_mode_flag )
    while( more_rbsp_trailing_data( ) )
        cabac_zero_word /* equal to 0x0000 */}
```

In AVC, encoder can change the size of NAL unit by inserting arbitrary numbers of cabac_zero_word in the case of CABAC. For decoder, decoder cannot judge whether the next "0x000003" is really cabac_zero_word plus EPB (Emulation Prevention Byte, 0x03) or not just by looking into the next 24bits from the end of rbsp_trailing_bits( )since "0x000003" can be existed in macroblock_layer( ), where RBSP stand for Raw Byte Sequence Payload.

In order to confirm the next 24 bits equal to "0x000003" is really cabac_zero_word plus EPB, decoder should read all the data from the end of rbsp_trailing_bits( )to the end of Network Abstract Layer unit. If all the data are composed of cabac_zero_word plus EPBs, decoder can say the next 24 bits from the end of rbsp_trailing_bits( )is surely cabac_zero_word plus EPBs. After detecting the starting position of arbitrary numbers of cabac_zero_word, decoder can know the size of Network Abstract Layer unit, and can use it for error detection. But it is too cycle consuming tasks for hardware or software to read all the data from the rbsp_trailing_bits( )to the end of Network Abstract Layer unit to confirm the cabac_zero_word.

Therefore, there is a need for a method and/or apparatus for detecting error in CABAC.

SUMMARY OF THE INVENTION

Embodiments of the present invention relate to a method and apparatus for error detection. The method includes decoding slice header when a unit is a NAL unit, decoding a macroblock unit and detecting an end of slice flag setting indicating end of slice, decoding RBSP trailing bits and determining if it is really end of slice; and determining an error occurred when it is not end of slice.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
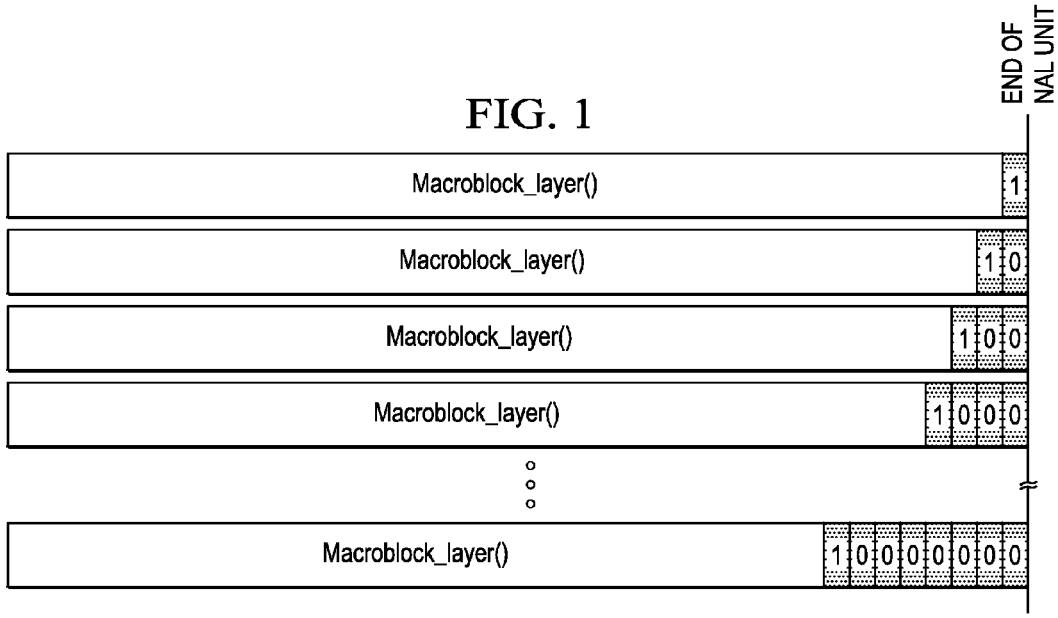
FIG. 1 is an embodiment depicting end of slice conditions.
Figure 2:
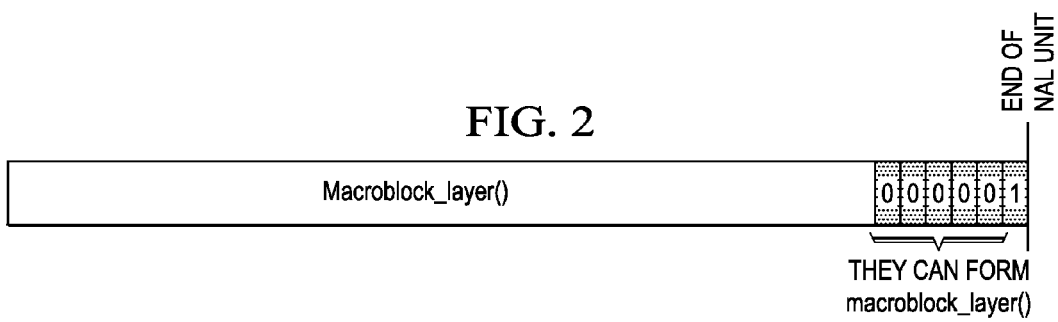
FIG. 2 is an embodiment of non-end of slice condition.

FIG. 1 is an embodiment depicting end of slice conditions and FIG. 2 is an embodiment of non-end of slice condition. In CAVLC, the CABAC has an indicator to show end of slice in a macroblock layer and an indicator to mark "zero words" can be appended to just before the end of NAL unit. Hence, the decoder can detect end of slice without looking into the remaining bits in the current NAL unit in CABAC.

Considering the possibilities of bit corruption or/and packet loss in the decoded bitstream, the decoded value of the end of slice indicator is not reliable. Therefore, the detection of Network Abstract Layer unit size mismatch in Context-Adaptive Binary Arithmetic Coding includes the detection of mismatch between the value of decoded end of slice indicator and end of slice condition derived from trailing bits, the remaining bits in the current Network Abstract Layer unit.

Figure 3:
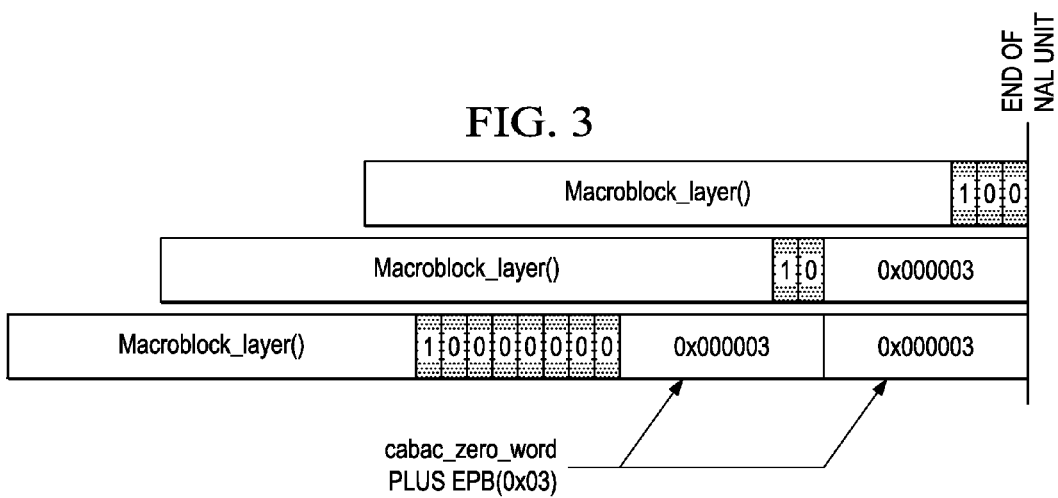
FIG. 3 is an embodiment of end of slice conditions with a "zero word" indicator with EPB.
Figure 4:
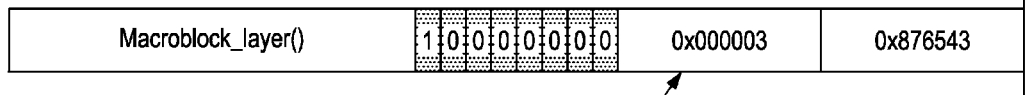
FIG. 4 is an embodiment of non-end of slice conditions with a "zero word" indicator with EPB.

Whereas, appending an indicator to mark "zero words" makes it difficult to derive end of slice condition from trailing bits. FIG. 3 is an embodiment of the end of slice conditions. In addition to checking the trailing bits after a macroblock layer, if the remaining bits in the current NAL unit after the trailing bits are not Zeros, the decoder also checks the contiguous bytes after the trailing bits for "zero words" indicator and EPBs (Emulation Prevention Bytes). If all the contiguous bytes are not the combination of "zero words" indicator and EPBs, as shown in FIG. 4, then the decoder determines that it is not the end of slice.

Figure 5:
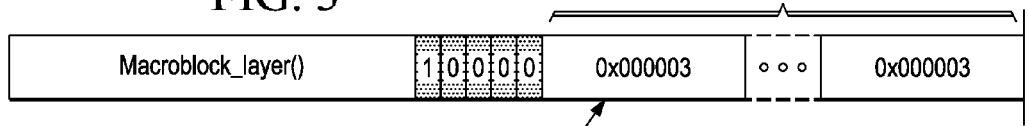
FIG. 5 is an embodiment of an extreme case that is possible in AVC.

FIG. 5 is an embodiment of an extreme case that is possible in Advanced Video coding. As shown in FIG. 5, there are many bytes remaining after the trailing bits. The first 3 bytes after the trailing bits are 0x0000003 and they are "zero word" indicator with an EPB. The decoder may not be able to determine if they are a "zero word" indicator with an EPB or if they are part of the next macroblock layer. The decoder would have to check all the remaining bytes in the current Network Abstract Layer unit, which is cycle consuming task for both hardware and software. Hence, it is preferable that the decoder be able to make such a determination without checking the remaining bytes. It is also preferable that the decoder be able to rely on the end of slice indicator. Thus, removing the "zero word" indicator would be advantageous, especially in High Efficiency Video Coding (HEVC).

In one embodiment a decoder using a delimiter (e.g. startcode or pointer) to separate the slice data and the stuffing bytes Instead of using CABAC zero word of the rbsp railing bits. In another embodiment, the decoder may use a data filler, i.e. filler_data RBSP (Raw Byte Sequence Payload), from the current slice data NAL unit instead of using CABAC zero word from the rbsp trailing bits.

For example, in one embodiment a decoder using delimiter is described by utilizing a software routine such as:

```
rbsp_slice_trailing_bits( ) {
    rbsp_trailing_bits( )
    if( entropy_coding_mode_flag ) {
        if (more_rbsp_trailing_data( ))
            delimiter /* equal to 0x000002 */
        while( more_rbsp_trailing_data( ) )
            cabac_zero_word /* equal to 0x00003 */}
```

As such, the problem in detecting end of slice, as described in the examples shown FIG. 4 and FIG. 5, is resolved. Rather than using Context-Adaptive Binary Arithmetic Coding CABAC zero word to keep the proper rate of bins to bits, a delimiter (e.g. startcode or pointer) maybe used to separate the slice data and the stuffing bytes. For example, the first cabac_zero_word can have a value of 0x000002 to act as a delimiter (since 0x000002 is a reserved codeword that does not appear in the bitstream), and the remaining cabac_zero_words can take on the values of 0x000003 as in Advanced Video coding. Hence, such a solution would allow for the comparison of decoded bits to Network Abstract Layer unit size (up to the delimiter) to be used as a method of error detection. Since it would be part of the byte stuffing, any error detected after the delimiter may be ignored.

In another embodiment, a data filler (RBSP) maybe used, where the filler is out of the current slice data. Thus, using data filler may simplify the byte stuffing process. An advantage of using data filler, such as filler_data RBSP instead of cabac_zero_words, is in simplifying the byte stuffing process. In one embodiment, depending on the variable k the following applies: (1) If k is less than or equal to 0, no cabac_zero_word is appended to the Network Abstract Layer unit; (2) Otherwise (k is greater than 0), the 3-byte sequence 0x000003 is appended k times to the Network Abstract Layer unit after encapsulation, where the first two bytes 0x0000 represent a cabac_zero_word and the third byte 0x03 represents a 3 byte mulation prevention, which requires a costly multiply by 3 and divide by 3 to accommodate the cabac_zero_word plus EPB (0x03) 3 bytes and appending CABAC zero words, also handled in multiple of 3 bytes.

On the other hand, a data filler, such as filler_data RBSP, removes the requirement of using a multiply by 3 and divide by 3. As such, the equation is simplified to k=Ceil((32*BinCountsInNALunits−RawMbBits*PicSizeInMbs)÷1024)−NumBytesInVclNALunits). Hence, the byte stuffing process is simpler, with lower implementation cost. As a result, the complexity of decoder implementation to detect bitstream error is reduced when comparing decoded bits and NAL unit size. Thus, implementing a delimiter (e.g. startcode or pointer) to separate the slice data and the stuffing bytes and using a data filler, such as, filler_data RBSP, simplifies the encoder byte stuffing process compared to cabac_zero_words insertion.

Figure 6:
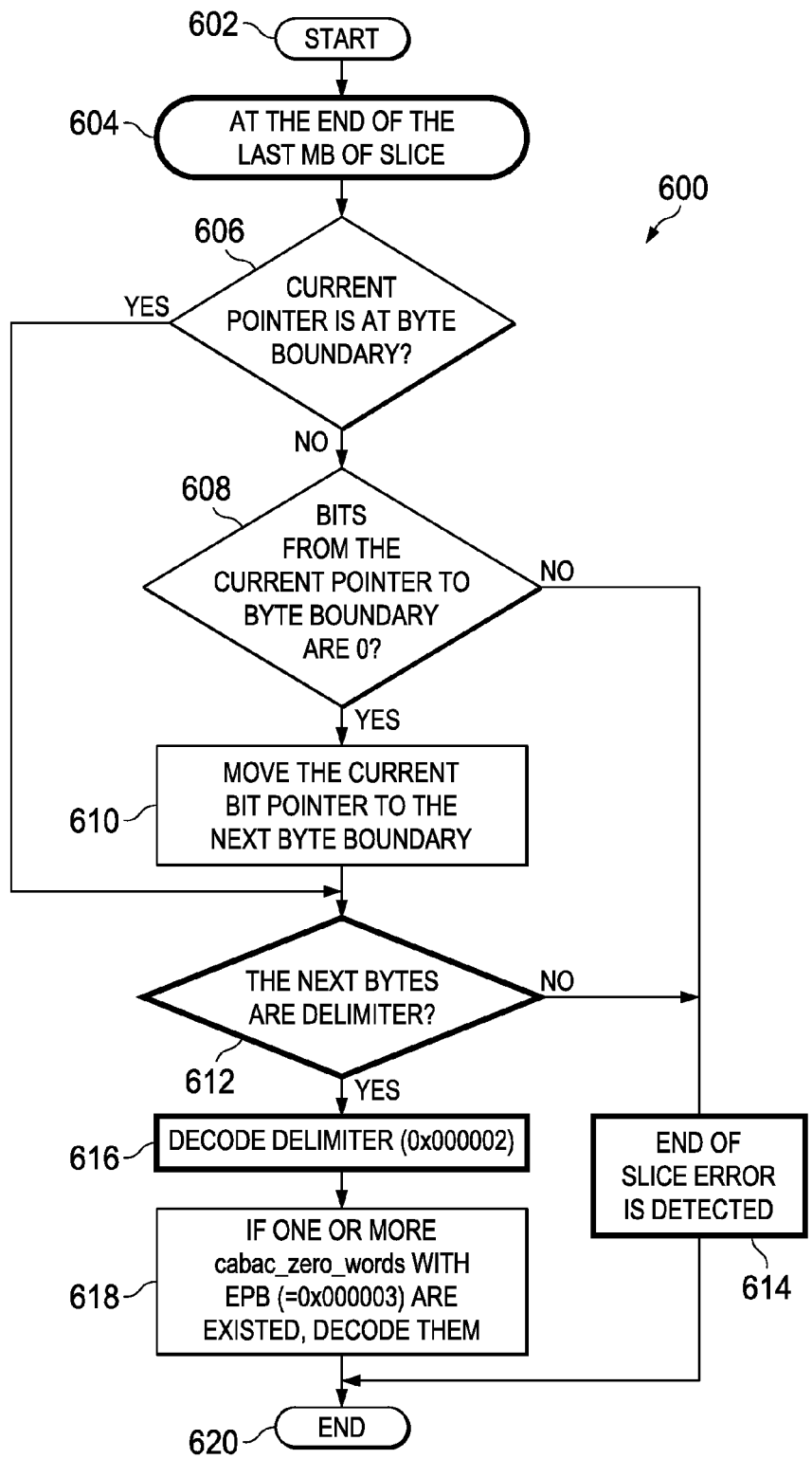
FIG. 6 is a flow diagram of a method for decoding a frame utilizing a delimiter in accordance with the present invention.

FIG. 6 is a flow diagram of a method 600 for decoding a frame utilizing a delimiter. The method 600 starts at step 602 and proceeds to step 604. At step 604, the method 600 determines it is the end of the last microblock of a slice. The method 600 determines, in step 606, if the current pointer is at a byte boundary. If "YES" it is pointing to a byte boundary, the method 600 proceeds to step 612. Otherwise, it is a "NO", and the method 600 proceeds to step 608. At step 608, the method 600 determines if the bits from the current pointer to byte boundary are zero. If "YES" the bits are zeros, the method 600 proceeds to step 610, wherein the method 600 moves the current bit pointer to the next byte boundary and proceeds to step 612. Otherwise, it is a "NO", and the method 600 proceeds to step 614, wherein the method 600 determines that there is an end of slice error and proceeds to step 620.

At step 612, the method 600 determines if the next bytes include a delimiter, such as, 0x000002. If the next bytes are not 0x000002, the "NO", and the method 600 proceeds to step 614, wherein the method 600 determines that there is an end of slice error. Otherwise, it is a "YES" and the method 600 proceeds to step 616, wherein the decoder decodes the delimiter. At step 618, the method 600 decoded any CABAC zero words. The method 600 ends at step 620.

Figure 7:
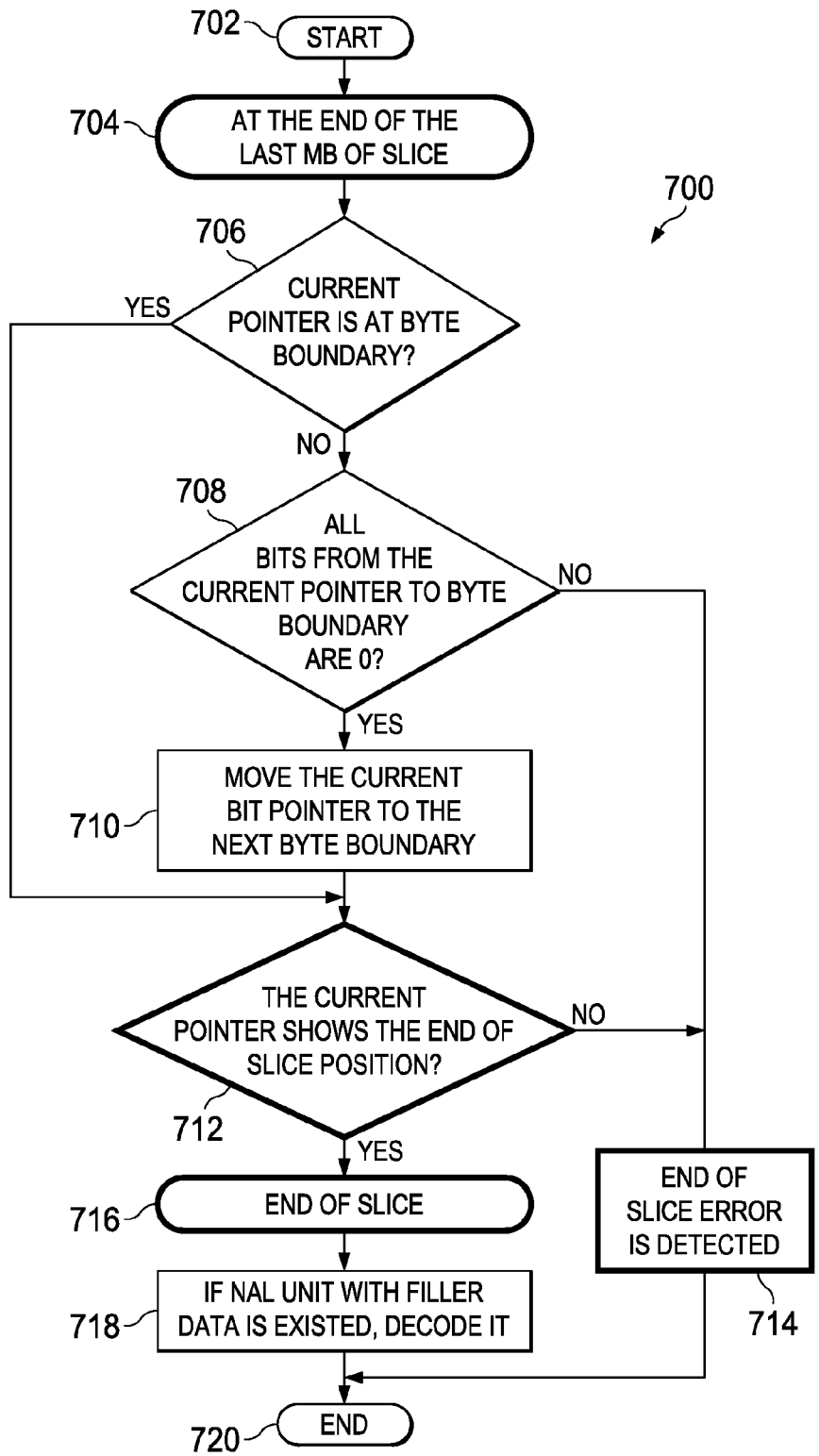
FIG. 7 is a flow diagram of a method for decoding a frame utilizing a data filler in accordance with the present invention.

FIG. 7 is a flow diagram of a method 700 for decoding a frame utilizing data filler. The method 700 starts at step 702 and proceeds to step 704. At step 704, the method 700 determines it is the end of the last microblock of a slice. The method 700 determines, in step 706, if the current pointer is at a byte boundary. If it is pointing to a byte boundary, the it is a "YES" and the method 700 proceeds to step 712. Otherwise, the method 700 proceeds to step 708. At step 708, the method 700 determines if the bits from the current pointer to byte boundary are zero. If the bits are zeros, the method 700 proceeds to step 710, wherein the method 700 moves the current bit pointer to the next byte boundary and proceeds to step 712. Otherwise, it is a "NO" and the method 700 proceeds to step 714, wherein the method 700 determines that there is an end of slice error and proceeds to step 720.

At step 712, the method 700 determines if the current pointer shows the end of slice position. If it is, then it is a "YES" and the method determines it is end of slice, at step 716 and proceeds to step 718. Otherwise, it is a "NO" and the method determines that there is an end of slice error, at step 714, and proceeds to step 720. At step 718, the method 700 decodes a NAL unit with filler data and proceeds to step 720. The method 600 ends at step 720. It is noted that the methods disclosed herein are performed by any device capable of executing computer instructions, such as a digital processor or multiple processors. Such devices or processors are capable of extracting computer instruction from any computer readable medium, such as a non-transitory computer readable mediums.

Figure 8:
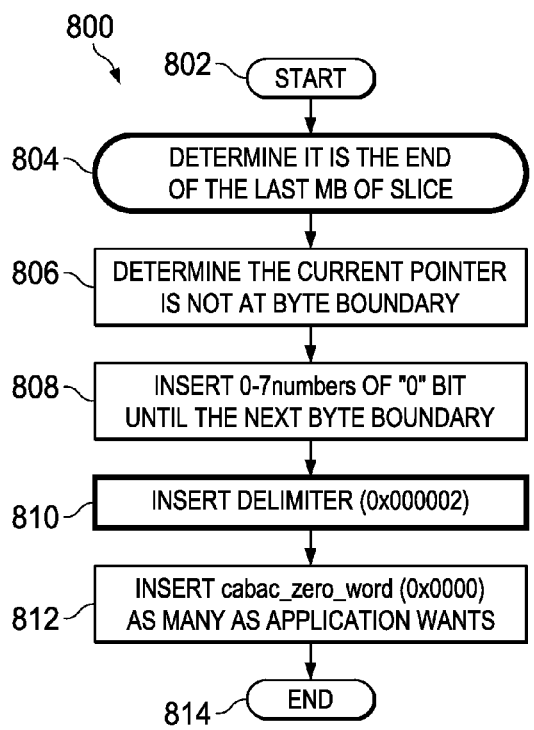
FIG. 8 is a flow diagram of a method for encoding a frame utilizing a delimiter in accordance with the present invention.

FIG. 8 is a flow diagram of a method for encoding a frame utilizing a delimiter in accordance with the present invention. The method 800 starts at step 802. At step 804, the method 800 determines that it is the end of the last microblock of the slice. At step 806, determine that the pointer is not at the byte boundary. At step 808, the method 800 inserts 0-7 numbers of "0" bit until the next byte boundary. At step 810, the method 800 inserts delimiter, i.e. 0x000002. In one embodiment, the method 800 inserts a delimiter that rarely takes place. At step 812, the method 800 inserts Context-Adaptive Binary Arithmetic Coding_(CABAC)_zero word, i.e. cabac_zero_word 0x0000. The method 800 may insert as many CABAC zero words as needed. The method 800 ends at step 814.

Figure 9:
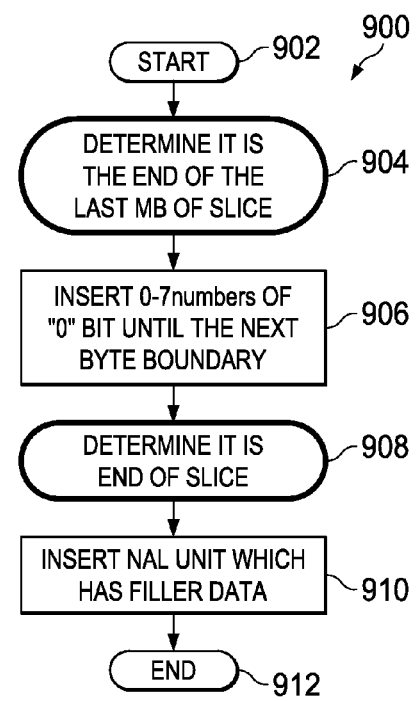
FIG. 9 is a flow diagram of a method for encoding a frame utilizing a data filler in accordance with the present invention.

FIG. 9 is a flow diagram of a method for encoding a frame utilizing a data filler in accordance with the present invention. The method 900 starts at step 902 and proceeds to step 904. At step 904, the method 900 determines that it is end of the last microblock. At step 906, the method 900 inserts 0-7 numbers of "0" bit until the next byte boundary. The method 900 may not insert the CABAC zero word. At step 908, the method 900 determines it is end of slice. At step 910, the method 900 inserts NAL unit with a filler data. The filler data may be composed of arbitrary number 0xFF. The bytes in filler data are counted into the bytes in coded slice NAL unit data. Thus, the inserted arbitrary filler data, i.e. 0xFF, may be used for byte stuffing process in order to keep the bin ration in CABAC. The method 900 ends at step 912.

While the foregoing is directed to embodiments of the present invention, other and further embodiments of the invention may be devised without departing from the basic scope thereof, and the scope thereof is determined by the claims that follow.

What is claimed is:

1. A non-transitory computer readable medium with computer instruction, when executed perform a method for error detection while decoding a CABAC encoded bitstream, the CABAC encoded bitstream encoded by at the end of a last microblock of a slice, determining that the pointer is not at the byte boundary, inserting a number of "0" bits until the next byte boundary, inserting a predetermined delimiter, and inserting as many CABAC zero words as needed, the method comprising:

determining decoding has reached a last microblock of a slice;

determining if a current pointer is at a byte boundary;

if the current pointer does not point to a byte boundary, determine if the bits from the current pointer to byte boundary are zero, if the bits from the current pointer to byte boundary are not zero, signal an end of slice error, if the bits from the current pointer to byte boundary are zero, move the current bit pointer to the next byte boundary, if the current pointer points to a byte boundary or upon moving the current bit pointer to the next byte boundary, determine if the next bytes include the predetermined delimiter, if the next bytes do not include the predetermined delimiter, signal an end of slice error, if the next bytes include the delimiter, decode the delimiter and any CABAC zero words.

2. The non-transitory computer readable medium of claim 1, wherein:

said predetermined delimiter is a multibit word rarely used in encoding.

3. The non-transitory computer readable medium of claim 1, wherein:

said predetermined delimiter is 000002.

4. A non-transitory computer readable medium with computer instruction, when executed perform a method for error detection while decoding a CABAC encoded bitstream, the CABAC encoded bitstream encoded by determining if encoding it is at an end of a last microblock, inserting a numbers of "0" bit not including the CABAC zero word until the next byte boundary, determining if encoding it is at an end of slice, inserting filler data in a NAL unit not counted in the number of bytes in a coded slice NAL unit data, the method comprising:

determining decoding has reached a last microblock of a slice;

determining if a current pointer is at a byte boundary;

if the current pointer does not point to a byte boundary, determine if the bits from the current pointer to byte boundary are zero, if the bits from the current pointer to byte boundary are not zero, signal an end of slice error, if the bits from the current pointer to byte boundary are zero, move the current bit pointer to the next byte boundary, if the current pointer points to a byte boundary or upon moving the current bit pointer to the next byte boundary, determine if the current pointer shows an end of slice position, if the current pointer does not show an end of slice position, signal an end of slice error, if the current pointer does not show an end of slice position, determine an end of slice position and decode a NAL unit having optional filler data.

* * * * *